(12) United States Patent
Minervini et al.

(10) Patent No.: US 12,487,821 B2
(45) Date of Patent: Dec. 2, 2025

(54) METHOD AND SYSTEM FOR EFFICIENT DATA MOVEMENT IN VECTOR PROCESSORS

(71) Applicant: BARCELONA SUPERCOMPUTING CENTER—CENTRO NACIONAL DE SUPERCOMPUTACIÓN, Barcelona (ES)

(72) Inventors: Francesco Minervini, Barcelona (ES); Oscar Palomar, Barcelona (ES); Osman Unsal, Barcelona (ES); Adrian Cristal Kestelman, Barcelona (ES)

(73) Assignee: BARCELONA SUPERCOMPUTING CENTER—CENTRO NACIONAL DE SUPERCOMPUTACIÓN, Barcelona (ES)

( * ) Notice: Subject to any disclaimer, the term of this patent is extended or adjusted under 35 U.S.C. 154(b) by 42 days.

(21) Appl. No.: 18/415,926

(22) Filed: Jan. 18, 2024

(65) Prior Publication Data

US 2025/0238231 A1    Jul. 24, 2025

(51) Int. Cl.
*G06F 9/30* (2018.01)
*G06F 15/80* (2006.01)

(52) U.S. Cl.
CPC ........ *G06F 9/30036* (2013.01); *G06F 9/3012* (2013.01); *G06F 15/8053* (2013.01)

(58) Field of Classification Search
None
See application file for complete search history.

(56) References Cited

U.S. PATENT DOCUMENTS 6,505,293 B1 * 1/2003 Jourdan ................ G06F 9/3838
712/E9.034
6,594,754 B1 * 7/2003 Jourdan ................. G06F 9/384
712/216

(Continued)

OTHER PUBLICATIONS

Vitruvius+: An Area-Efficient RISC-V Decoupled Vector Coprocessor for High Performance Computing Applications, F. Minervini et al, Publisher: ACM Transactions on Architecture and Code Optimization, Feb. 2023, 25 pages.

*Primary Examiner* — Eric Coleman
(74) *Attorney, Agent, or Firm* — Nathan & Associates Patent Agents Ltd.; Menachem Nathan

(57) ABSTRACT

The present invention discloses a computer implemented method for efficient data movement operations in vector processors comprising a number of logical registers (1), a larger number of physical registers (2), and a set of alias counters (5), wherein each alias counter (5) corresponds to a physical register (2) and stores the number of different logical registers (1) to which said physical register (2) is simultaneously assigned. The method of the invention consists of copying the first v, (vector length (4)) elements of a source vector from a source logical register (8) assigned to a source physical register (10) into a destination vector in a destination logical register (9) assigned to a destination physical register (11). This is done by assigning the source physical register (10) to the destination logical register (9), thus freeing the destination physical register (11) and by increasing in one unit the alias counter (5) associated to the source physical register (10) denoting that said source physical register (10) is assigned to more than one different logical registers (1) simultaneously.

9 Claims, 2 Drawing Sheets

(56) References Cited

U.S. PATENT DOCUMENTS

| | | | |
|---|---|---|---|
| 9,575,754 B2* | 2/2017 | Keller | G06F 9/30181 |
| 2003/0217249 A1* | 11/2003 | Postiff | G06F 9/384 |
| | | | 712/E9.05 |
| 2009/0327661 A1* | 12/2009 | Sperber | G06F 9/3885 |
| | | | 712/217 |
| 2012/0005459 A1* | 1/2012 | Fleischman | G06F 9/30032 |
| | | | 712/216 |
| 2014/0068230 A1* | 3/2014 | Madduri | G06F 9/30036 |
| | | | 712/216 |
| 2014/0189324 A1* | 7/2014 | Combs | G06F 12/0292 |
| | | | 712/225 |
| 2016/0179515 A1* | 6/2016 | San Adrian | G06F 9/4552 |
| | | | 712/221 |

* cited by examiner

METHOD AND SYSTEM FOR EFFICIENT DATA MOVEMENT IN VECTOR PROCESSORS

FIELD OF THE INVENTION

The present invention belongs to the field of computer-implemented methods. More specifically, the invention relates to a method for optimizing the movement of data in vector processors by implementing instructions executed at the register renaming stage of the computations performed therein.

BACKGROUND OF THE INVENTION

Every day the amount of available data increases. From medical data to financial data, among many others, the processing and analysis of all these pieces of information allows us to move forward in research and development. High Performance Computing (HPC) aims at solving advanced computational problems based on this large amount of data by using advanced devices, technologies, and techniques.

Among these technologies lie vector processors, which operate on arrays of data where a single datum of the array is referred to as a vector element. A dedicated Instruction Set Architecture (ISA) defines the vector architectural parameters, such as the number of vector registers and the Maximum Vector Length (MVL). This allows for a high level of data-level parallelism (DLP) in the performance of the required computations that aligns with the aim of HPC.

When compared to Single Instruction Multiple Data (SIMD) architectures, vector processors offer a higher level of abstraction. SIMD architectures, like the ARM Neon or the Intel AVX-512, are characterized by the fact that many elements are packed in the same register, which can be computed by the available functional units. To exploit DLP, the software needs to know how many functional units, also called SIMD lanes, are available to produce effective code. Additionally, the maximum number of elements that can be processed in parallel is limited by the size of the registers. Any attempt to increase the size of the registers and/or the number of functional units implies the introduction of new dedicated instructions, reducing the portability of the Instruction Set Architecture (ISA). This problem was solved by encapsulating the number of elements to process in the instruction encoding and controlling it through a Control and Status Register (CSR). Although this solution is feasible for specific Machine Learning (ML) workloads, the number of maximum elements within one operation is still limited by the size of the scalar registers. If the size of the scalar registers increases, new combinations of mixed-width operations are possible, and the ISA needs to be modified at least to specify the new setting of the CSR that holds the SIMD width. On the contrary, vector ISAs are agnostic of the number of available functional units, and the number of elements to be processed is only limited by the defined MVL. Thus, the use of vector processors is well motivated in HPC, since they provide higher levels of abstraction that allow easier and more efficient implementations of DLP.

A vector processor comprises a series of functional units, that perform the operations and calculations forwarded from the instruction set, and a series of (vector) registers (quickly accessible locations available to the processor during the computations) arranged as a Vector Register File (VRF). In fact, in the development of vector processors, the VRF was introduced to interconnect and allow data movements between the functional units and the vector registers. In general, two types of registers are to be used: logical and physical. Logical vector registers are referenced within instruction fields and therefore accessible to software, whereas physical registers are located in the hardware register file. Logical registers are dynamically mapped onto physical registers via the VRF.

Some vector processors are equipped with out-of-order capabilities, typically supported by vector register renaming: a technique that abstracts logical registers from physical registers in order to reduce dependencies within instructions so as to speed up their execution. For these architectures, the number of physical registers is larger than the number of logical registers, with the former not visible to software, whereas for architectures that do not implement register renaming, the number of logical (or architectural) and physical registers is the same.

One of the most common operations performed by vector processors is what is called vector-vector moves, i.e., the movement of data contained in a vector into another vector. This implies implementing a set of instructions that take a source vector register and copy its content, either partially or totally, into a destination vector register. In vector processors equipped with out-of-order capabilities, the standard implementation of vector-vector moves consumes one physical register for the destination vector register even though it is practically no different than the copied source vector register.

Additionally, classical implementation of these instructions will need to schedule accesses to the VRF to compute the operation. In particular, the following steps will need to be performed:
  read the source vector elements up to the vector length set by the operation, which determines the number of elements to copy to the destination vector; and
  write the destination vector elements with the read source vector elements, up to the set vector length.

These steps are repeated several times, especially in the case of large vector lengths. Therefore, these operations may take multiple clock cycles to complete, regardless of the fact that the resultant vector will be a partial or total copy of the source vector. Besides this, the multiple accesses to the VRF implies commutations on the read and write busses, which directly translate in additional power consumption while performing no real computation, given that the destination vector elements have exactly the same values as the source vector elements.

Some applications from the HPC domain intensively use vector move instructions to place partial values in a new vector register to compute the next steps of the algorithm while freely using the source vector register for other computations. For instance, vectorized versions of Jacobi-2D and Streamcluster, which are part of the aforementioned application domains, use vector-vector moves in the code, accounting for the 30% of the total amount of arithmetic instructions in said processes. With no optimizations, vector-vector move operations could quickly consume the available physical registers and limit the register renaming look-ahead capabilities. Additionally, classical implementation of these instructions will need to schedule accesses to the VRF to compute the operation.

Therefore, a procedure to free as many physical registers as possible so as not to slow down the computation pipeline and to reduce energy consumption during data movement processes is, up to this day, missing in the art.

SUMMARY OF THE INVENTION

The present invention aims to overcome the above-mentioned limitations of the vector processors in the art. It does so by proposing a new method focused on the fact that the destination vector elements are an exact copy of the source vector elements, in such a way that no real arithmetic computation needs to be performed. By implementing said method, the execution of vector-vector moves completes in just three clock cycles, preserving or increasing the number of free physical registers and contributing to energy and power efficiency by avoiding any access to the VRF.

Advantageously, a first object of the invention relates to a computer implemented method for efficient data movement operations in vector processors, said data being stored as one or more elements of one or more vectors. This method comprises the use of a vector processor comprising, in turn, a plurality of physical registers; a plurality of logical registers, the number of logical registers being smaller than the number of physical registers; and a set of alias counters, wherein each alias counter corresponds to a physical register and stores the number of different logical registers to which said physical register is simultaneously assigned.

Within this configuration, the method of the invention advantageously comprises performing the following steps:
 a) selecting, as a source vector, a vector to be copied from a logical register, said logical register being identified as a source logical register and being assigned to a physical register identified as a source physical register;
 b) selecting, from a logical register, and as a destination vector, a vector into which the source vector selected in step a) is to be copied, said logical register being identified as a destination logical register and being assigned to a physical register identified as a destination physical register;
 c) executing an instruction to copy the first elements of the source vector up to a vector length, $v_l$, into the $v_l$ first elements of the destination vector;
 d) assigning the source physical register to the destination logical register, thus freeing the destination physical register; and
 e) increasing in one unit the alias counter associated to the source physical register denoting that said source physical register is assigned to more than one different logical registers simultaneously.

By implementing the described method, several advantages with respect to classical implementations of vector-vector moves arise. The first of these advantages is that the movement operation completes in just three clock cycles, independently of the vector length, whereas classical implementations may take large numbers of cycles to complete, even more so for large vector lengths. For instance, assuming a long-vector architecture with up to 256 64-bit elements, a classical implementation of the vector-vector move would have to copy every of the 256 elements of the source vector register into the destination vector register, which takes multiple cycles generally in the order of tens of cycles.

Another relevant advantage is that, contrary to classical implementations, the number of physical registers is either preserved or increased since the data movement operation does not need to consume a physical register to be computed. Therefore, a vector processor with multiple available functional units can exploit the wide set of available physical registers to sustain concurrent execution of multiple vector instructions. Consequently, the backpressure on the core issuing the instruction to the vector pipeline is relaxed and the core can continue with the execution of the instruction stream. This translates into faster computations (shorter latency), since memory overloads are prevented, meaning that subsequent operations do not need to be queued due to lack of free registers for the computations, as it is the case many times in classical implementations.

Besides this, the method of the invention provides higher energy efficiency, since there is no need for physical data movement of elements from the source vector register to the destination vector register. This means that there will be no allocation in the issue queue of vector instructions, in the internal operand buffer of the vector processor, and in the result buffer of the vector processor, and the accesses to the vector register file are avoided. All this contributes to lower switching activity on the internal nodes of the vector processor which finally contributes to reducing the dynamic power consumption.

It is to be noted that, due to its specific design, the method of the invention can be exploited regardless of the order of arrival of the vector-vector move instructions.

Interestingly, different types of arithmetic operations among vectors can be identified as data movement operations, beyond the case in which a vector is to be copied either totally or partially into another vector. For instance, the following operations:
 a vector addition with one of the sources being a scalar with value 0;
 a vector multiplication or division with one of the sources being a scalar value with value 1;
 or a vector slide up or down operation with one of the source being a scalar with value 0 or bigger than the current vector length;
can be converted to vector-vector moves and can thus exploit the advantages of the method of the invention to complete their execution in just three cycles. In this sense, a vector to be copied into another vector, a vector to be added with one or more scalar values with value 0, a vector to be multiplied or divided by one or more scalar values with value 1 or a vector to be subjected to a slide up or slide down operation with one of the sources being a scalar with value 0 or bigger than the current vector length would be identified as the source vector selected in step a).

In a preferred embodiment, the method of the invention also includes the use of a Register Alias Table (RAT), to keep track of the information of the assignment of the physical vector registers to the logical vector registers; and a Free Register List (FRL), comprising a list of the free physical vector registers that can therefore be assigned to one or more logical vector registers. In a further preferred embodiment of the invention, the method also includes an element table comprising one entry for each of the logical vector registers, wherein each entry corresponds to the initial number of elements contained in each of the logical vector registers. These three elements would be updated throughout the performance of the method according to the register assignments carried out therein.

A second object of the invention relates to a system comprising computing means provided with hardware and/or software means adapted to perform a method according to any of the described embodiments. The hardware means may comprise a RISC-V decoupled vector processing unit and the software means may comprise an ISA extension wherein the instructions related to the execution of the steps of the method of the invention are encoded.

In a further preferred embodiment of the invention, the ISA extension comprises the following specifications:
 32 logical (architectural) vector registers;
 40 physical vector registers, therefore introducing 8 additional registers over the architectural registers;
 out-of-order execution capabilities based on vector register renaming; and 40 alias counters.

It may also specify a RAT, a FRL and an element table.

A third object of the invention relates to a computer program comprising instructions which, when the program is executed by computing means, cause the computing means to carry out a method according to any of the above-described embodiments.

In summary, the proposed method provides an efficient, memory and energy saving procedure for data movement operations in vector processors, by mapping multiple logical vector registers to the same physical vector register whenever a vector-vector move operation is executed.

BRIEF DESCRIPTION OF DRAWINGS

FIG. 1A shows the configuration before the data movement operation has taken place whereas FIG. 1B shows the configuration after the data movement operation has taken place.

FIG. 2A shows the configuration before the data movement operation has taken place whereas FIG. 2B shows the configuration after the data movement operation has taken place.

NUMERIC REFERENCES USED IN THE DRAWINGS

| | |
|---|---|
| 1 | Logical register |
| 2 | Physical register |
| 3 | Element table |
| 4 | Vector length |
| 5 | Alias counters |
| 6 | Register alias table (RAT) |
| 7 | Free register list (FRL) |
| 8 | Source logical register |
| 9 | Destination logical register |
| 10 | Source physical register |
| 11 | Destination physical register |

DETAILED DESCRIPTION OF THE INVENTION

Some preferred embodiments of the invention, shown in FIGS. 1-2, will be now described for illustrative, but not limiting purposes.

Figure 1A:
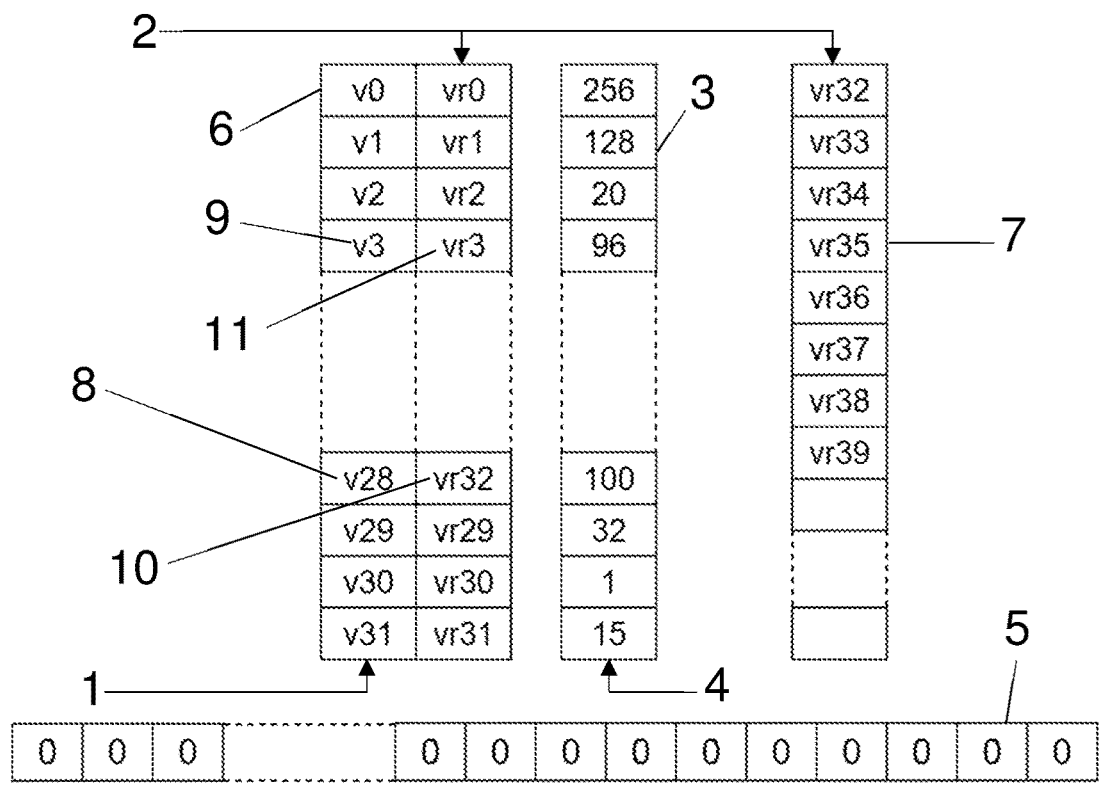
FIGS. 1A and 1B show an example of the implementation of the method when copying (i.e., when performing a data movement operation) the first 13 elements of a vector stored in the logical vector register $v_{28}$ into a vector associated with the logical vector register $v_3$.
Figure 1B:
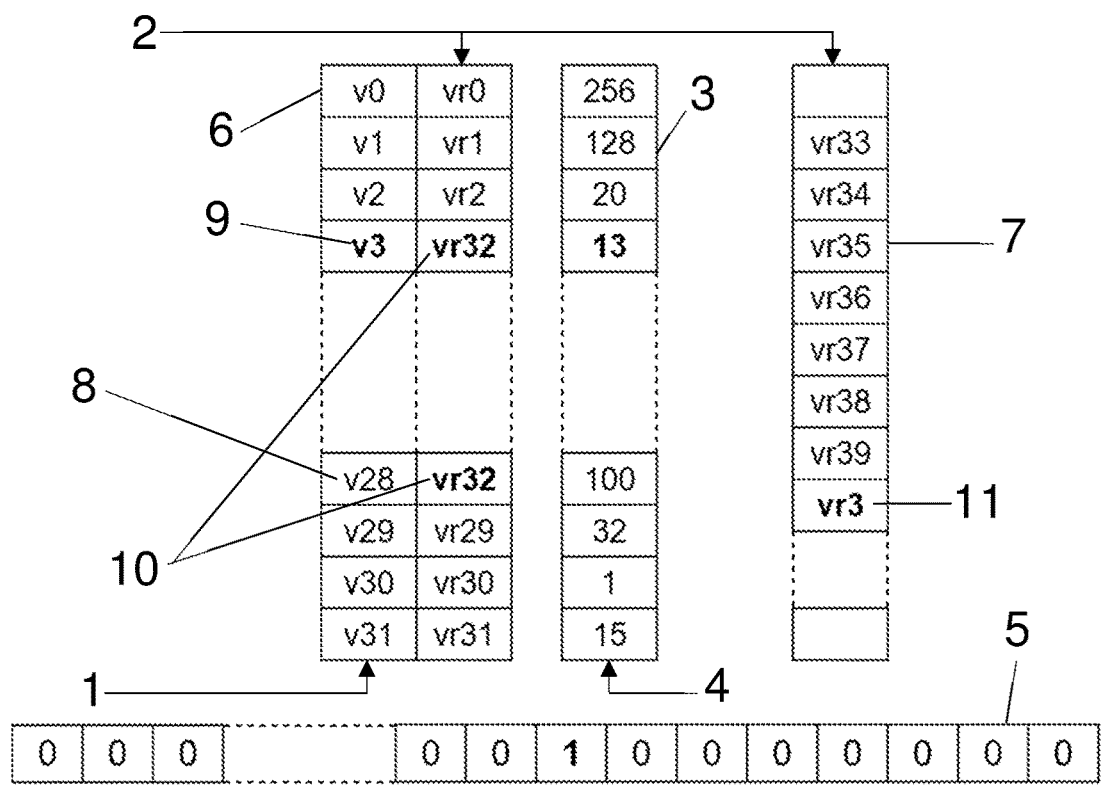

FIGS. 1A and 1B show an example of the implementation of the method of the invention. This method consists of mapping multiple logical registers (1) into a single physical register (2) of a vector processor whenever a data movement operation is executed. In this way, no physical data movement is needed, since only "alias" between logical (1) and physical (2) vector registers are created, thus allowing for faster computations (reduced latencies) and for diminishing the memory and energy consumption of the processor.

In a preferred embodiment of the invention, compatible with the example depicted in FIGS. 1A and 1B, a RISC-V decoupled vector processor is used. Thirty-two architectural (i.e., logical) registers (1) are established by the ISA, and, in order to introduce further parallelism, lightweight out-of-order execution capabilities empowered by vector register renaming are included as 8 additional physical registers (2), up, therefore, to a total of 40 physical registers (2) in the processor.

To optimize the vector-vector move instructions, the renaming unit of the processor is modified by including two additional structures represented in FIGS. 1A and 1B. The first additional structure is the element table (3), comprising one entry for each of the logical registers (1) and wherein each entry corresponds to the number of elements (i.e., vector length (4), $v_l$) contained in each of the logical registers (1). The other structure is that of the alias counters (5): a set of 40 counters, each related to one of the 40 physical registers (2), where each counter keeps track of the number of times that the same physical register (2) is assigned to multiple logical registers (1). When the renaming unit works in the standard mode, i.e., associating one physical register (2) to a unique logical register (1) like in, for instance, many addition operations, the alias counter (5) of that physical register is 0. On the contrary, whenever a data movement operation is executed according to the method of the invention, one physical register (2) is assigned to multiple logical registers (1), and its corresponding alias counter (5) is increased.

In a further preferred embodiment, another two structures, also shown in FIGS. 1A and 1B, are used in the implementation of the method of the invention: the Register Alias Table (6) (RAT) and the Free Register List (7) (FRL), which correspond to components of the renaming stage. In the following, and according to FIGS. 1A-1B and 2A-2B, logical registers (1) are denoted as "$v_X$", with X being a numerical identifier, while physical registers (2) are identified by "$vr_Y$", with Y being a numerical identifier.

Within this setup, data movement operations can be done fast and efficiently. In the example depicted in FIGS. 1A and 1B, the first 13 elements of a vector stored in the logical register (1) $v_{28}$ are copied (moved) into a vector stored in the logical register (1) $v_3$. Thus, the vector stored in the logical register (1) $v_{28}$ is identified as the source vector, and the vector stored in the logical register (1) $v_3$ is identified as the destination vector. Consequently, logical registers $v_{28}$ and $v_3$ are identified as the source (8) and destination (9) logical registers, respectively.

The corresponding physical registers (2) can be identified by inspecting the RAT. There, the physical register (2) associated to the source logical register (8) $v_{28}$ is the one denoted as $vr_{32}$, and, therefore, the source physical register (10) corresponds to $vr_{32}$. Similarly, the destination physical register (11) is that associated in the RAT to the destination logical register (9) ($v_3$), which, in the present case, is $vr_3$. This case may correspond to a circumstance in which another arithmetic operation involving the vector stored in the logical register (1) $v_{28}$ has taken place before the data movement operation. For instance, in this particular example, two vectors, stored in logical registers (1) $v_1$ and $v_2$, might have been added so that the final result of the addition is stored in the vector corresponding to logical register (1) $v_{28}$ and to the physical register (2) $v_{32}$.

FIG. 1A shows the configuration before the data movement operation has been executed. There, all the alias counters (5) are set to 0, the source logical register (8) $v_{28}$ is assigned to the source physical register (10) $vr_{32}$ and the destination logical register (9) $v_3$ is assigned to the destination physical register $vr_3$ (11). The vectors stored in the source and the destination logical registers (8, 9) have vector lengths (4) of 100 and 96, respectively. This can be seen in the element table (3), depicted in all the Figures. Finally, the available physical registers (2), i.e., those which are free to be assigned to a logical register (1), are gathered in the FRL (7), also shown in all the figures.

With this configuration, a data movement operation corresponding to copying the first 13 elements of the vector associated with the source logical register (8) $v_{28}$ to the destination logical register (9) $v_3$ is executed. The result can be seen in FIG. 1B. By implementing the method of the invention, in one cycle, this instruction accesses the RAT (6) to read the last physical registers (2) assigned to $v_3$ and $v_{28}$, which are $vr_3$ and $vr_{32}$, respectively. In the next cycle, it writes $vr_{32}$ to the RAT (6) entry corresponding to $v_3$ and updates the alias counter (5) of $vr_{32}$ and the new value of assigned elements (in this case, thirteen) in the element table (3). The instruction is completed in the next cycle, as it does not need to be executed in the functional units. From now on, $v_3$ is mapped to $vr_{32}$ with vector length (4) 13. Regarding the FRL (7), $v_{32}$ is removed from it, since it has been assigned to $v_3$, but $vr_3$ is included since it has been freed precisely by this assignment, so, in practice, no physical register (2) has been consumed in the data movement operation. Therefore, the fast data movement optimization reduces the memory load, the latency of execution to just three cycles and the power dissipation by avoiding unnecessary accesses to the VRF.

If, after the data movement operation, i.e., parting from the configuration shown in FIG. 1B, another data movement operation was to be perform in order to copy $v_3$ into another vector, it is to be noted that the process would be exactly as described, but only the 13 copied elements (or less) will be transferred to the new destination vector.

When a data movement is retired, the alias counters (5) are decreased. The corresponding physical register (2) is written back to the FRL (7) when its associated alias counter (5) is 0. Imagining a long sequence of vector-vector moves, by executing them implementing the method of the invention one could potentially have all 32 logical registers (1) renamed to the same physical register (2). This means that only one out of the 40 physical registers (2) would be assigned. The other 39 would be available for renaming new instructions. In this way, the renaming look-ahead capabilities can be further exploited to get more instructions into the execution stage in the vector unit, as many physical registers (2) will be available for renaming.

Figure 2A:
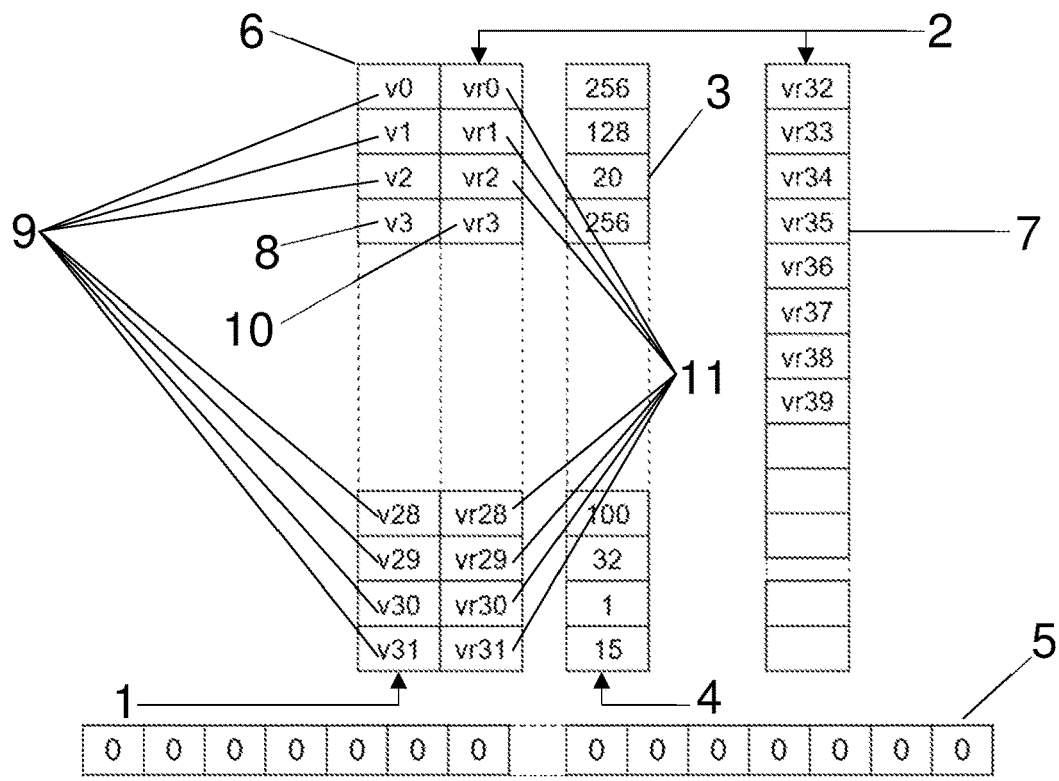
FIGS. 2A and 2B show an example of the implementation of the method when copying (i.e., when performing a data movement operation) all the (96) elements of a vector stored in the logical vector register $v_3$ into 31 vectors associated with logical registers $v_0$-$v_2$ and $v_4$-$v_{31}$, respectively.
Figure 2B:
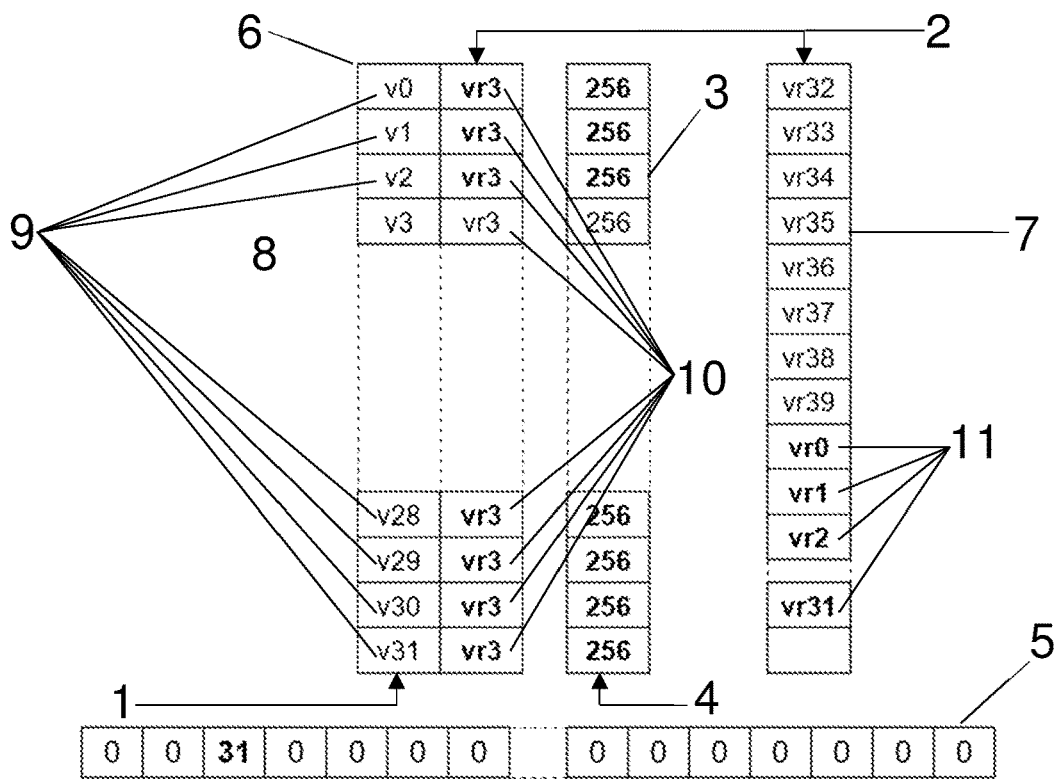

This is the case depicted in FIGS. 2A and 2B. Again, FIG. 2A represents the configuration before the data movement operations and FIG. 2B represents the configuration afterwards. In this case, the overall process corresponds to a case in which the whole vector length (4) (i.e., its 256 elements) stored in the source logical register (8) $v_3$ is copied into 31 vectors, each stored in the destination logical registers (9) $v_0$-$v_2$, and $v_4$-$v_{31}$, respectively. This example highlights the difference with the prior art in executing this instruction.

In the initial configuration, shown in FIG. 2A, all alias counters (5) are set to 0, each logical register (1) is assigned to the corresponding physical register (2) (i.e., each $v_X$ is assigned to $vr_X$), the vector processor has 8 free physical registers (2) for renaming in the FRL (7) ($vr_{32}$-$vr_{39}$), and a sequence of data movement operations copying $v_3$ to the different $v_X$ (with X=[0-2,4-31] is to be executed.

In a classical implementation, the vector-vector move operations will physically copy the 256 elements of $v_3$ (corresponding to physical $vr_3$ as shown in the RAT (6)) into each corresponding destination logical register (9), and each destination logical register (9) will be assigned a physical register (2) from the FRL. This means that every single vector-vector move instruction will proceed in the vector processor pipeline as follows:

It will take one cycle to complete the renaming of each instruction. Without implementing the method of the invention, each destination logical register (9) will be assigned to the first available physical register (2) in the FRL (7). For example, v0 will be assigned to $vr_{32}$, $v_1$ to $vr_{33}$, $v_2$ to $vr_{34}$, and so on.

It will then take one cycle to enter the issue stage.

Assuming 8 functional units to physically copy the content of the source physical register (10) $vr_3$ into the destination physical register (11) of each instruction, and assuming a maximum bandwidth of the VRF to provide 5 elements on each read or write as it is the case in many baseline vector processors, in the best case, each instruction will take at least 14 cycles in the execution stage for the vector length (4) of 256. Each functional unit will have 32 elements assigned (256/8). In order to read these 32 elements from the VRF, 7 cycles are needed since reads are executed in blocks of 5. Similarly, 7 cycles are needed to write the elements in blocks of 5.

Finally, after executing, each instruction needs one cycle to be marked as completed.

The previous description assumes the best case for every instruction, which is to be completed in about 17 cycles. It is only after these 17 cycles that the former physical register (2) of each destination physical register (11) can be freed and written back to the FRL (7). For example, if the copy of $v_3$ to $v_0$ is to be completed, after 17 cycles the physical register (2) $vr_0$ will be written back to the FRL (7), since $v_0$ was assigned to $vr_{32}$, the first available one in the FRL (7). However, it is to be noted that, after renaming the first 8 instructions during 8 consecutive cycles, assigning $v_0$ to $vr_{32}$, $v_1$ to $vr_{33}$, $v_2$ to $vr_{34}$, $v_4$ to $vr_{35}$, $v_5$ to $vr_{36}$, $v_6$ to $vr_{37}$, $v_7$ to $vr_{38}$, and $v_8$ to $vr_{39}$, then the FRL (7) would be empty as there are no more free physical registers (2) available. The following instructions will need to wait until the copy of $v_3$ to $v_0$ completes before the first of them can enter the vector processor pipeline. From this point on, one instruction every 17 cycles will be accepted. Assuming the total amount of 31 vector-vector moves, after 17×31=527 cycles the FRL will again have 8 available physical registers (2), assuming no new instructions enter the vector processor. This is a very large number of cycles which can limit the instruction issue window of the vector processor. Besides this, the several accesses to the VRF to read and write imply switching activity on the internal nodes, which directly translates to an increased power consumption.

The method of the invention deals with this limitation by introducing the alias counters (5) and by completing the vector-vector move directly at renaming, so no physical write into the VRF will happen for these instructions, which means that there is no added power consumption in contrast with the state-of-the-art implementation. No physical registers (2) are consumed from the FRL (7), because all the vectors $v_0$-$v_2$, and $v_4$31 are assigned to the same physical register (2) as $v_3$ ($vr_3$), as shown in FIG. 2B. Because of this, each vector-vector move always takes three cycles to complete, regardless of the vector length (4) value, as it only needs to update the alias counters (5) and the elements table (3).

Within the process, all the destination logical registers (9), except that of $v_3$, are mapped to the source physical register (10) $vr_3$, and the alias counter (5) corresponding to $vr_3$ is incremented up to 31 (the number of logical registers (1) all assigned to that same physical register (2)). Therefore, after 3×31=93 cycles (five times less than with standard techniques), the whole sequence of 31 vector moves is completed, and, moreover, the FRL (7) has 39 free physical registers (2) available for new instructions. This increases the instruction issue bandwidth from 8 to 39 instructions that can be renamed by the vector processor.

Experimental implementations of these and other, more complex, examples, have shown faster execution of the applications (on average 1.5 faster over the unoptimized version), as well as a reduction in the traffic to the VRF and, consequently, on the switching activity which leads to lower power consumption (on average, 10% with respect to the unoptimized design). Therefore, the proposed method provides an efficient, memory and energy saving procedure for data movement operations in vector processors, by mapping multiple logical registers (1) to the same physical register (2) whenever a vector-vector move operation is executed.

What is claimed is:

1. A computer implemented method for efficient data movement operations in vector processors, said data being stored as one or more elements of one or more vectors, the method comprising the use of a vector processor comprising:
   a plurality of physical registers;
   a plurality of logical registers, the number of logical registers being smaller than the number of physical registers; and
   a set of alias counters, wherein each alias counter corresponds to a physical register and stores the number of different logical registers to which said physical register is simultaneously assigned;
   and characterized in that the method further comprises performing the following steps:
   a) selecting, as a source vector, a vector to be copied from a logical register, said logical register being identified as a source logical register and being assigned to a physical register identified as a source physical register;
   b) selecting, from a logical register, and as a destination vector, a vector into which the source vector selected in step a) is to be copied, said logical register being identified as a destination logical register and being assigned to a physical register identified as a destination physical register (11);
   c) executing an instruction to copy the first elements of the source vector up to a vector length, $v_1$, into the $v_1$ first elements of the destination vector;
   d) assigning the source physical register to the destination logical register, thus freeing the destination physical register (11); and
   e) increasing in one unit the alias counter associated to the source physical register denoting that said source physical register is assigned to more than one different logical registers simultaneously.

2. The method of claim 1, wherein the source vector is selected among one of the following:
   a vector to be copied into another vector;
   a vector to be added with one or more scalar values with value 0;
   a vector to be multiplied or divided by one or more scalar values with value 1; and
   a vector to be subjected to a slide up or slide down operation with one of the sources being a scalar with value 0 or bigger than the current vector length.

3. The method of claim 1, further comprising the use of a Register Alias Table (RAT), comprising the initial information of the assignment of the physical registers to the logical registers, and wherein the following step is further comprised after step d):

f) updating the RAT according to the previous register assignment.

4. The method of claim 1, further comprising the use of a Free Register List (FRL), comprising an initial list of the free physical registers that can therefore be assigned to one or more logical registers, and wherein the following step is further comprised after step d):

f') updating the FRL according to the previous register freeing.

5. The method of claim 1, further comprising the use of an element table comprising one entry for each of the logical registers, wherein each entry corresponds to the initial number of elements contained in each of the logical registers, and wherein the following step is further comprised after step d):

f''') updating the element table according to the number of elements stored in the destination vector.

6. A system comprising computing means characterized in that said computing means comprise hardware and/or software means adapted to perform a method according to claim 1.

7. The system of claim 6, wherein the hardware means comprise a RISC-V decoupled vector processing unit and wherein the software means comprise an ISA extension encoding the instructions of execution of the steps of the method of claim 1.

8. The system of claim 7, wherein the ISA extension comprises the following specifications:
   32 logical registers;
   40 physical registers;
   out-of-order execution capabilities based on vector register renaming; and
   40 alias counters.

9. A computer program product comprising one or more computer-readable hardware storage devices having thereon computer-executable instructions that are structured such that, when executed by one or more processors of a local computing system, cause the computing system to perform a method for efficient data movement operations in vector processors, said data being stored as one or more elements of one or more vectors, the method comprising the use of a vector processor comprising:
   a plurality of physical registers;
   a plurality of logical registers, the number of logical registers being smaller than the number of physical registers; and
   a set of alias counters, wherein each alias counter corresponds to a physical register and stores the number of different logical registers to which said physical register is simultaneously assigned;
   the method further comprising performing the steps of:
   a) selecting, as a source vector, a vector to be copied from a logical register, said logical register being identified as a source logical register and being assigned to a physical register identified as a source physical register;
   b) selecting, from a logical register, and as a destination vector, a vector into which the source vector selected in step a) is to be copied, said logical register being identified as a destination logical register and being assigned to a physical register identified as a destination physical register (11);
   c) executing an instruction to copy the first elements of the source vector up to a vector length, vl, into the vl first elements of the destination vector;
   d) assigning the source physical register to the destination logical register, thus freeing the destination physical register (11); and e) increasing in one unit the alias counter associated to the source physical register denoting that said source physical register is assigned to more than one different logical registers simultaneously.

\* \* \* \* \*